US012100089B1

(12) United States Patent
Elahie (10) Patent No.: US 12,100,089 B1
(45) Date of Patent: Sep. 24, 2024

(54) SYSTEMS AND METHODS FOR GENERATING AND ANIMATING THREE-DIMENSIONAL ASSETS WITH A DYNAMIC RESOLUTION

(71) Applicant: Illuscio, Inc., Culver City, CA (US)

(72) Inventor: Dwayne Elahie, Culver City, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/480,713

(22) Filed: Oct. 4, 2023

(51) Int. Cl.
*G06T 13/40* (2011.01)
*G06T 3/4053* (2024.01)
*G06T 7/11* (2017.01)
*G06T 17/00* (2006.01)

(52) U.S. Cl.
CPC ............ *G06T 13/40* (2013.01); *G06T 3/4053* (2013.01); *G06T 7/11* (2017.01); *G06T 17/00* (2013.01)

(58) Field of Classification Search
None
See application file for complete search history.

(56) References Cited

U.S. PATENT DOCUMENTS

| | | | |
|---|---|---|---|
| 2022/0300681 A1* | 9/2022 | Ren | G06T 17/00 |
| 2022/0391548 A1* | 12/2022 | Boettner | G06F 30/10 |

OTHER PUBLICATIONS

Qian et al. "Deep Magnification-Flexible Upsampling Over 3D Point Clouds;" Sep. 30, 2021; in IEEE Transactions on Image Processing, vol. 30, pp. 8354-8367 (Year: 2021).*
Rashidi et al. "Built infrastructure point cloud data cleaning: an overview of gap filling algorithms." Oct. 2013; International Conference on Construction Applications of Virtual Reality; pp. 594-602 (Year: 2013).*
Yu et al.; "PU-Net: Point Cloud Upsampling Network;" 2018; Proceedings of the IEEE Conference on Computer Vision and Pattern Recognition (CVPR), 2018, pp. 2790-2799 (Year: 2018).*

* cited by examiner

*Primary Examiner* — Peter Hoang
(74) *Attorney, Agent, or Firm* — Ansari Katiraei LLP; Arman Katiraei; Sadiq Ansari (57) ABSTRACT

Disclosed is a graphics system and associated methods for generating and animating three-dimensional ("3D") assets with a dynamic resolution. The graphics system receives a 3D asset at a first resolution, defines procedural surfaces that recreate the overall shape of the 3D asset, and generates the 3D asset at any desired resolution from the defined procedural surfaces. Specifically, the graphics system partitions the overall shape of the 3D object into simpler shapes, defines equations that recreate the simpler shapes, and generates new points amongst the existing points at positions along surfaces that are created by each of the equations. The graphics system generates the 3D asset at a second resolution that is greater than the first resolution by rendering the new points with the existing points.

20 Claims, 8 Drawing Sheets

SYSTEMS AND METHODS FOR GENERATING AND ANIMATING THREE-DIMENSIONAL ASSETS WITH A DYNAMIC RESOLUTION

BACKGROUND

Three-dimensional ("3D") models for games, movies, and/or other 3D scenes are typically created as a connected set of meshes or polygons. Animating a 3D model includes linking different meshes or polygons of the 3D model to an animation framework, and stretching, skewing, or other manipulating the size and shape of the meshes so that the meshes or polygons remain connected while matching the movements that are specified for a linked animation element of the animation framework.

The resolution of a 3D model may be derived from the number and size of the meshes or polygons forming the 3D model. However, once the meshes or polygons for a 3D model are generated and connected, the resolution or maximum level-of-detail represented by that 3D model is fixed.

In order to increase the resolution of the 3D model, the 3D model has to be reconstructed with an entirely new set of meshes. The 3D model cannot simply be scaled to include more meshes and to increase the resolution due to the connectivity between the existing meshes, the linking of the existing meshes to the animation framework, textures that are mapped or applied to the existing meshes, and/or other issues arising during the rendering pipeline. This greatly limits the reusability of the 3D model for future projects or for future releases of a game, movie, and/or other 3D scenes when additional compute or rendering resources become available.

DETAILED DESCRIPTION OF PREFERRED EMBODIMENTS

The following detailed description refers to the accompanying drawings. The same reference numbers in different drawings may identify the same or similar elements.

Provided are systems and associated methods for generating and animating three-dimensional ("3D") assets with a dynamic resolution. The systems and methods involve defining a 3D asset once, and rendering the 3D asset at any resolution, including a resolution that is greater than the original resolution of the 3D asset, based on the 3D asset definition. For instance, the rendering may include generating the 3D asset at a first resolution for frames of a first animation in which the shape and form of the 3D asset change based on an animation framework that is linked to a particular 3D asset definition, and generating the 3D asset at a second resolution for frames of a second animation in which the shape and form of the 3D change based on the same or different animation framework that is linked to the same particular 3D asset definition. The 3D asset may be rendered at the different resolutions based on a changing render position that necessities the resolution change for presenting the 3D asset at a consistent level-of-detail, or based on the animations exposing parts of the 3D asset that are defined with a lower level-of-detail and that are dynamically upscaled to maintain a consistent or desired level-of-quality with other parts of the 3D asset.

A 3D graphics system defines a 3D asset using points of a point cloud that are disconnected from one another and that are distributed in a 3D space to represent the form of a 3D object. The 3D graphics system parameterizes the point cloud or the surfaces created by different sets of points of the point cloud so that the surfaces may be modeled procedurally or represented by equations that accurately recreate the surfaces formed by the different sets of points. The set of points represented by each procedural surface may be infinitely scaled by generating new or additional points at positions along the procedural surface. The newly generated points dynamically scale or increase the resolution of the 3D asset while improving the level-of-detail by positioning the generated points to maintain the shape, form, and/or visual continuity of the surfaces formed by the original or existing point cloud points. Consequently, the 3D graphics system may render the 3D asset at any desired resolution or may dynamically adjust the resolution of any animation involving the 3D asset using the existing 3D asset definition without redefining or reconstructing the 3D asset at each desired resolution.

Figure 1:
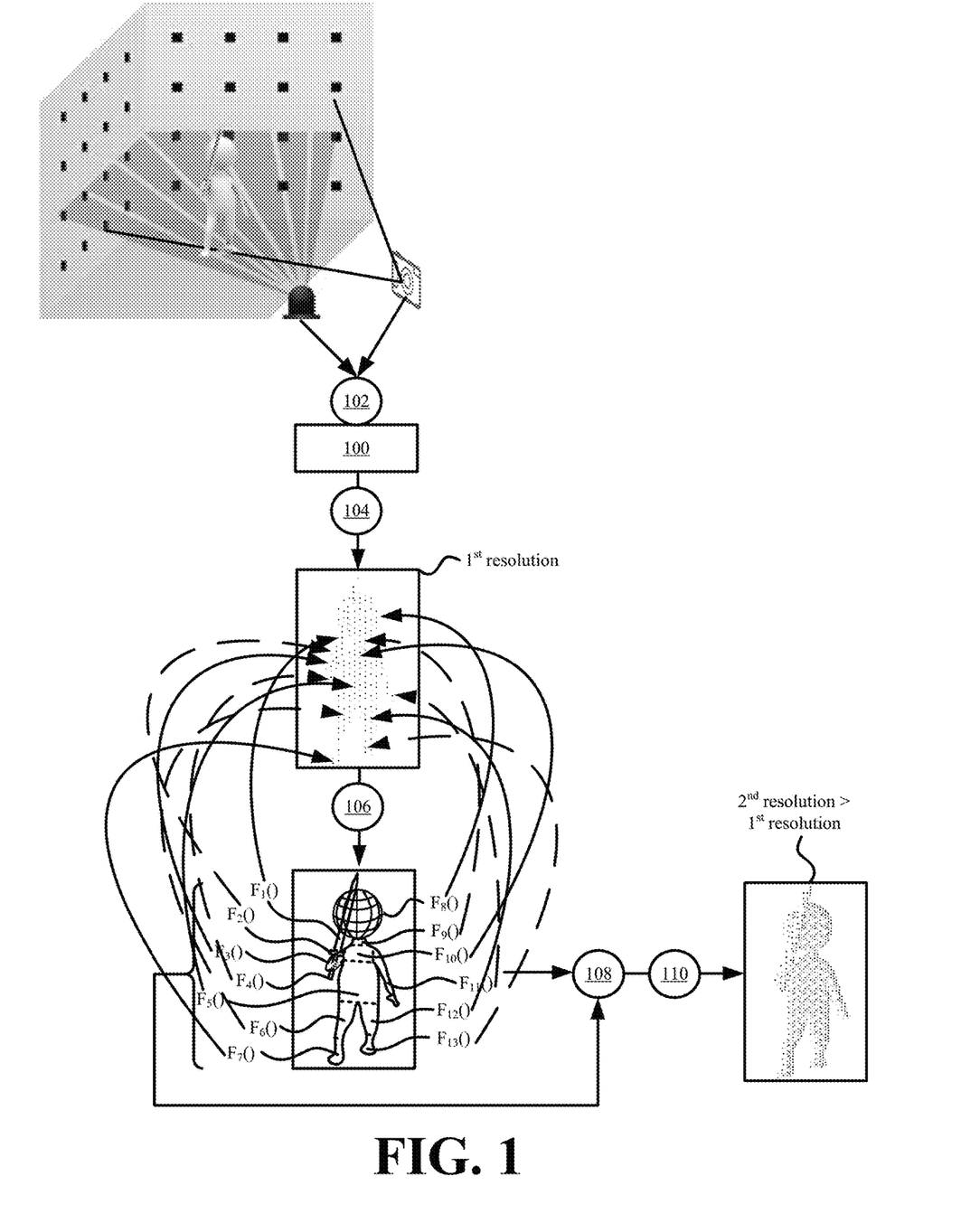
FIG. 1 illustrates an example of generating a three-dimensional ("3D") asset with a dynamic resolution in accordance with some embodiments presented herein.

FIG. 1 illustrates an example of generating a 3D asset with a dynamic resolution in accordance with some embodiments presented herein. 3D graphics system 100 receives (at 102) one or more scans of a 3D object. 3D graphics system 100 includes one or more devices with processor, memory, storage, network, and/or other hardware resources used for the processing and rendering of 3D assets with the dynamic resolution. 3D graphics system 100 may be implemented locally on a user device (e.g., a desktop computer), or may be a hosted service that is remotely accessed over a data network using the user device.

The received (at 102) scans measure positions of different points, features, or elements about the 3D object and/or capture visual characteristics (e.g., colors) for the measured points, features, or elements. In some embodiments, the positional measurements are generated using a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. In some embodiments, the positional measurements and visual characteristics may be captured using two or more devices. For instance, a first imaging device (e.g., a LiDAR sensor) may determine the position for each point of the 3D object, and a second imaging device (e.g., a camera) may measure or capture the characteristics or other non-positional information for each point. One or more photogrammetry techniques may be used to consolidate the data from the first imaging device and the second imaging device. 3D graphics system 100 receives (at 102) the 3D positional measurements and the visual characteristics from the one or more scanning or imaging devices.

In response to receiving (at 102) the scan, 3D graphics system 100 generates (at 104) a point cloud representation of the 3D object. Specifically, 3D graphics system 100 converts the positional measurements into points that are distributed at corresponding or mapped positions in a 3D space of a point cloud. The points recreate the structure of the 3D object in the 3D space of the point cloud. 3D graphics system 100 may map the visual characteristics that are captured from the surfaces of the 3D object to points at corresponding or mapped positions in the 3D space of the point cloud. In other words, 3D graphics system 100 colorizes the point cloud points based on colors and other visual characteristics that are captured from measured positions across the surfaces of the 3D object. 3D graphics system 100 generates (at 104) the point cloud at a first resolution corresponding to the number of measured points or positions. In some embodiments, receiving (at 102) the scan includes receiving the point cloud at the first resolution based on the scan results being converted to the points of the point cloud prior to being transmitted to 3D graphics system 100.

Some surfaces or parts of the 3D object may be occluded or obstructed during scanning. Accordingly, the generated (at 104) point cloud may have regions with differing densities of points, regions represented at different resolutions based on the number of points and the spacing of the points in the region, and/or regions that have visual discontinuity as a result of no or a minimal number of points being generated for the occluded or obstructed surfaces of the 3D object.

3D graphics system 100 creates the 3D asset definition from the scanned, received, or generated point cloud at the first resolution, and uses the 3D asset definition to generate and/or render the 3D asset with a dynamic or increased resolution relative to the point cloud at the first resolution in order to improve the visual quality and/or detail of the rendered 3D asset. Specifically, the increased resolution may remove the visual discontinuity from the occluded or obstructed surfaces of the 3D object while enhancing the detail at which the occluded or obstructed surfaces are rendered.

To create the 3D asset definition, 3D graphics system 100 parameterizes (at 106) the point cloud representation of the 3D object. Parameterizing (at 106) the point cloud representation includes constructing the form of the 3D object from the points of the point cloud at the first resolution, partitioning the 3D object form into increasingly simpler shapes, and defining procedural surfaces that match or represent the partitioned shapes formed by different subsets of the points. For instance, 3D graphics system 100 selects a first subset of points that form a concave curved surface, determines a first equation for a first procedural surface that recreates that concave curved surface, associates the first equation or the first procedural surface to the first set of points or the first region of the point cloud spanned by the first set of points, selects a second subset of points that form a convex curved surface, determines a second equation for a second procedural surface that recreates that convex curved surface, and associates the second equation or the second procedural surface to the second set of points or the second region of the point cloud spanned by the second set of points. If a selected set of points form a complex shape that cannot be accurately or exactly represented with an equation or a single procedural surface, 3D graphics system 100 may segment or divide the selected set of points into different subsets of points that form two simpler shapes that may each be represented with a different equation or procedural surface. Accordingly, parameterizing (at 106) the point cloud representation includes representing the morphology of the 3D object represented by the point cloud using different procedural surfaces.

3D graphics system 100 creates (at 108) the 3D asset definition by associating the different procedural surfaces to the set of points that form the shape of the procedural surface. Associating a particular procedural surface to a particular set of points may include inserting an identifier for the particular procedural surface in a non-positional element or metadata of each point of the particular set of points, or defining 3D coordinates of the particular procedural surface for the region spanned by the particular set of points, and/or another linking of the particular procedural surface to the particular set of points or the region in the 3D space of the point cloud that is spanned by the particular set of points or the surface formed from the particular set of points.

3D graphics system 100 generates (at 110) the 3D asset at any desired resolution using the 3D asset definition. For instance, 3D graphics system 100 may receive a request to the render the 3D asset at a second resolution that is greater than the first resolution of the generated (at 104) point cloud. 3D graphics system 100 retrieves the set of points that are associated with each procedural surface, determines a number of additional points that increases the resolution of a particular surface represented by the set of points from the first resolution to the second resolution, and generates new points amongst the existing set of points with positions determined from the shape of the procedural surface that is associated with or linked to the particular surface. In other words, 3D graphics system 100 adds points at positions along the procedural surfaces that remove visual discontinuities with detail (e.g., the newly generated points) that conforms to or enhanced the original shapes created by the different sets of points linked to the procedural surfaces. More specifically, the added points are not simply inserted at the center of two neighboring points. Instead, the procedural surfaces define positions for the newly added points that follow and enhance the original detail, texture, and/or form of the 3D object. Generating (at 110) the 3D asset may include rendering the point cloud with the added points to produce a visualization of the 3D object at the enhanced second resolution.

Figure 2:
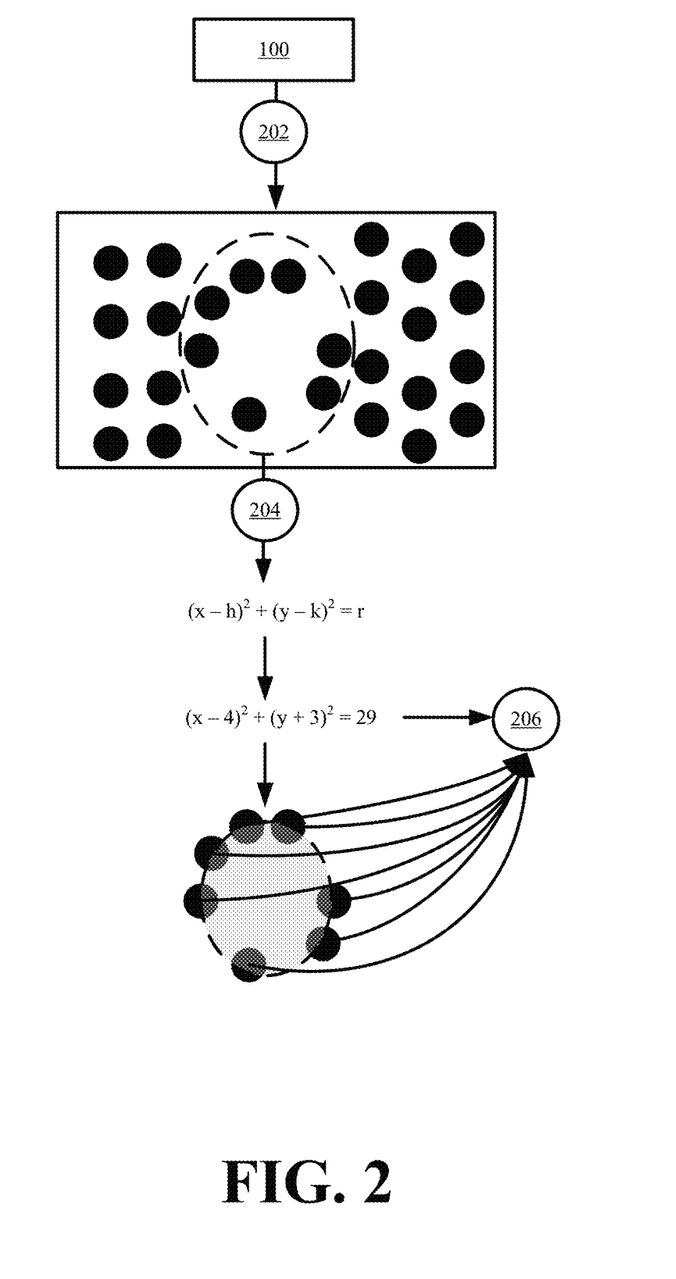
FIG. 2 illustrates an example of defining one or more procedural surfaces from a parameterized region of a point cloud in accordance with some embodiments presented herein.

FIG. 2 illustrates an example of defining one or more procedural surfaces from a parameterized region of a point cloud in accordance with some embodiments presented herein. 3D graphics system 100 selects (at 202) a set of points from a point cloud for parameterization. 3D graphics system 100 may select (at 202) the set of points to include points that have some positional commonality or non-positional (e.g., color) commonality. Points with the positional or non-positional commonality may include points that form a common surface or a continuous shape. 3D graphics system 100 may base the selection (at 202) on the detected commonality as single continuous surfaces are more easily represented with a procedural surface than a random selection of neighboring points that form different diverging surfaces. In some embodiments, 3D graphics system 100 may render the points of the point cloud, may analyze the rendered shapes or surfaces, and may select (at 202) the set of points corresponding to a surface that has a procedural or mathematical representation.

3D graphics system 100 selects (at 204) a parameterized equation that best matches or approximates the shape of the selected (at 202) set of points. 3D graphics system 100 adjusts parameters of the selected (at 204) equation to match the shape created by the adjusted parameters of the equation to the shape formed by the selected (at 202) set of points. FIG. 2 illustrates the selected (at 202) set of points as points distributed across two dimensions and the selected (at 204) equation as an equation for a generating a two-dimensional ("2D") for purposes of simplicity. Since the points of a point cloud are distributed in a 3D space, the selected (at 202) set of points may represented points distributed across three dimensions and the selected (at 204) equation may be an equation that forms a 3D shape of volume.

If the selected (at 204) equation cannot be adjusted to create the shape formed by the selected (at 202) set of points with a threshold degree of accuracy or with less than a threshold amount of deviation from the shape, 3D graphics system 100 may partition the set of points into two or more subsets of points that form two or more simpler shapes. However, if the selected (at 204) equation can be adjusted to create the shape formed by the selected (at 202) set of points with the threshold degree of accuracy or with less than the threshold amount of deviation from the shape, 3D graphics system 100 may associate (at 206) the equation to the selected (at 202) set of points.

The equation defines a procedural surface. The procedural surface is a representation of the shape or surface formed by the set of points as a mathematical implicit equation and/or one or more splines. For instance, the procedural surface may be defined as a non-uniform rational basis spline ("NURBS"). A NURBS surface may be a function of two or more parameters that maps to the shape or surface formed by the set of points. The shape of the NURBS surface is determined by control points. In some embodiments, procedural modeling techniques may be used to define and tune the equation so that the resulting procedural shape matches the shape or form created by the selected (at 202) set of points.

Associating (at 206) the equation to the selected (at 202) set of points includes establishing a link or relationship between the procedural surface created by the equation and the selected (at 202) set of points. In some embodiments, associating (at 206) the equation includes orienting or positioning the procedural surface in the 3D space of the point cloud so that the selected (at 202) set of points are aligned with or contact different points along the procedural surface. In other words, the equation may be defined with a set of coordinates for the region or volume of space within the point cloud where the procedural surface represented by the equation is found.

To increase the resolution for the shape or surface formed by the selected (at 202) set of points, 3D graphics system 100 generates new points about the procedural surface so that the new points increase the resolution of the shape or surface formed by the selected (at 202) set of points while also enhancing its quality or detail by providing more points that create the shape or surface.

Figure 3:
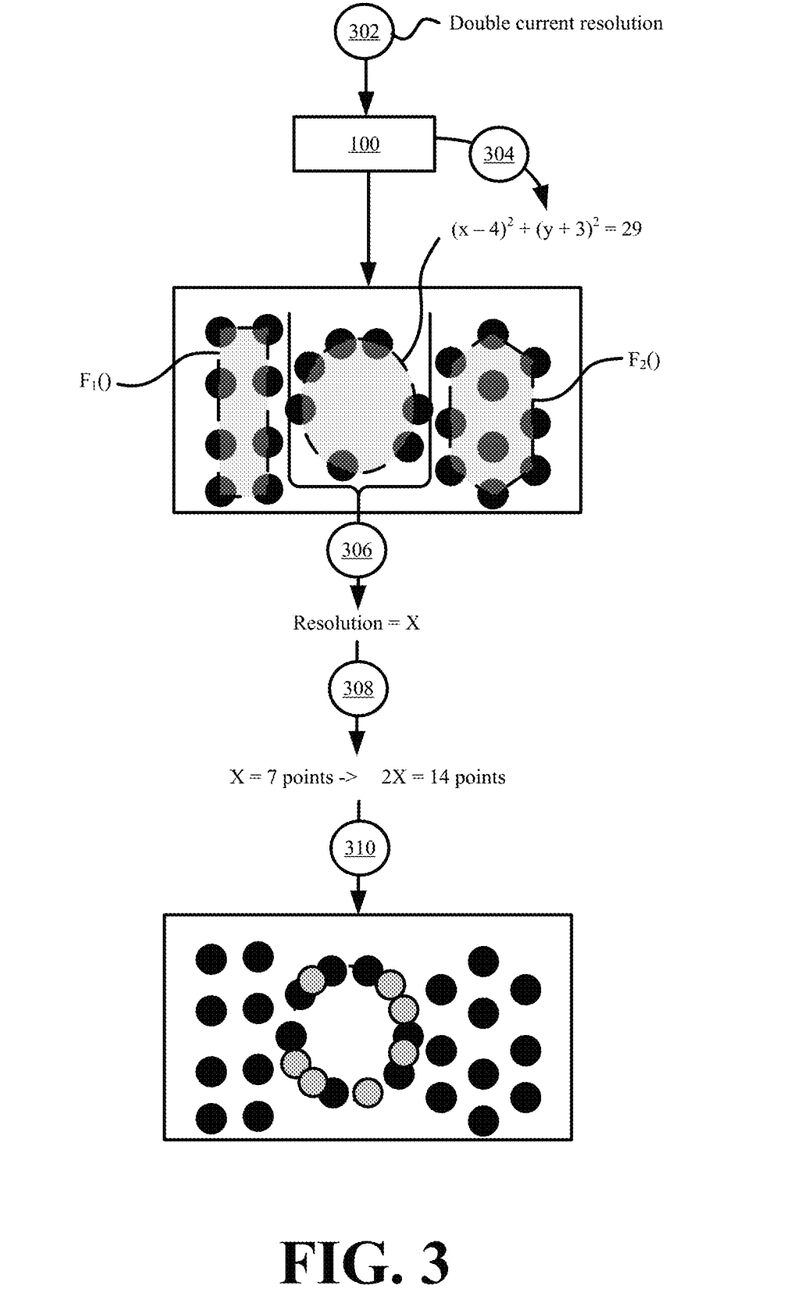
FIG. 3 illustrates an example of dynamically increasing the resolution at a particular region of a point cloud that forms a particular shape or surface of a 3D object in accordance with some embodiments presented herein.

FIG. 3 illustrates an example of dynamically increasing the resolution at a particular region of a point cloud that forms a particular shape or surface of a 3D object in accordance with some embodiments presented herein. 3D graphics system 100 receives (at 302) a request or is configured to dynamically increase (e.g., double) the resolution of the 3D asset and render the 3D object at a resolution that is greater than a resolution of the point cloud representing that 3D object.

3D graphics system 100 selects (at 304) the procedural surface or equation that is associated with the set of points at the particular region of the point cloud and that form the particular shape or surface of the 3D object. In some embodiments, the particular region of the point cloud may include the set of points that are within a current field-of-view chosen to be enhanced. In some other embodiments, 3D graphics system 100 may increase the resolution for the entirety of the 3D asset by selecting each defined procedural surface or equation in some order, and increasing the resolution in the region spanned by that procedural surface or question before selecting the next procedural surface or equation. In some embodiments, the procedural surface is mapped or is associated with the coordinates of the particular region or is linked to the set of points spanning the particular region.

3D graphics system 100 determines (at 306) the current resolution of the set of points positioned in the particular region and/or the resolution of the particular shape or surface formed by the set of points. In some embodiments, the current resolution is determined based on the density of points or the spacing between the set of points in the particular region. In some embodiments, the current resolution is determined based on the number of points in the particular region and the size of the particular region.

3D graphics system 100 computes (at 308) a number of points to add in order to increase the current resolution of the particular region to the requested resolution. In some embodiments, the requested resolution may specify a number of points to be rendered in a given region of the 3D space, a number of pixels with which to render or represent the particular region in a visualization, or a multiple of the current resolution. For instance, the requested resolution may specify rendering the point cloud with double, triple, etc. the current number of points.

3D graphics system 100 renders (at 310) the particular region and/or the shape or surface formed by the set of points at the requested resolution by generating the determined number of additional points about positions on the procedural surface according to the current distribution or positioning of the set of points. In other words, 3D graphics system 100 does not simply generate new points at positions that are determined from averaging the positions of two or more of the set of points. Similarly, 3D graphics system 100 does not equally distribute the points along the procedural surface. Instead, 3D graphics system 100 analyzes the distribution of the existing set of points, and generates the new points along the procedural surface in a manner that enhances the density, spacing, structure, and/or relationships between the set of points as determined from analyzing the distribution of the existing set of points.

3D graphics system 100 may increase the resolution for the entire point cloud or the 3D object represented by the point cloud by selecting each procedural surface that represents a different shape or surface of the 3D object, and by adding points so that the different shape or surface represented by each procedural surface is rendered at the increased resolution. In some embodiments, 3D graphics system 100 adds more points to a first region than to a second region in order to render the first region and the second region at the same increased or dynamic resolution. For instance, the part of the 3D object represented in the first region of the point cloud may have been obscured, partially obstructed, or positioned away from a scanner that measure the positions along that part of the 3D object, whereas the part of the 3D object represented in the second region of the point cloud may have been completely unobscured, positioned close to, and directed at the scanner such that the scanner generates more measurements or points for the second region than for the first region. When rendering the 3D asset represented by the point cloud at the dynamic resolution, 3D graphics system 100 may generate more points in the first region than in the second region in order to render the first and second regions of the 3D asset at the same dynamic resolution.

Figure 4:
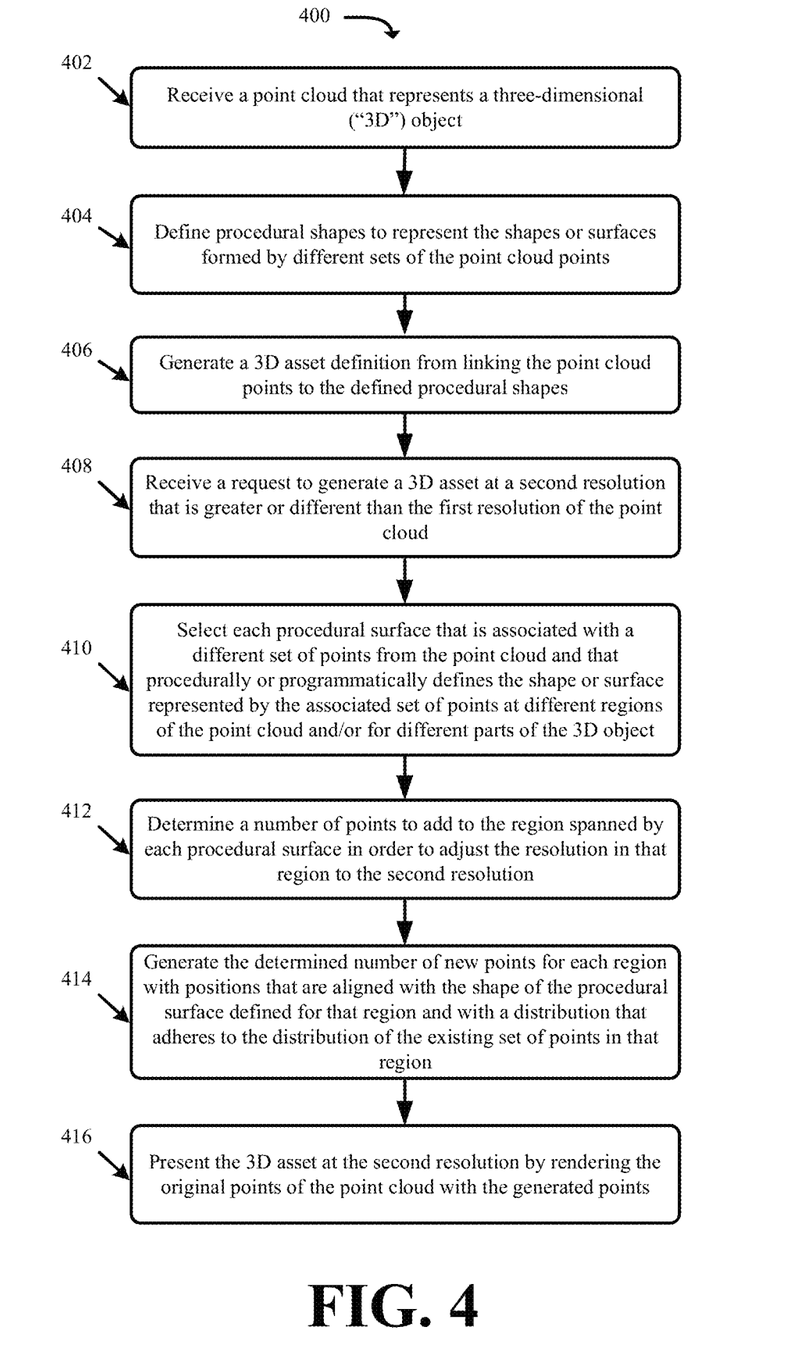
FIG. 4 presents a process for generating and rendering a 3D asset at a dynamic resolution in accordance with some embodiments presented herein.

FIG. 4 presents a process 400 for generating and rendering a 3D asset at a dynamic resolution in accordance with some embodiments presented herein. Process 400 is implemented by 3D graphics system 100.

Process 400 includes receiving (at 402) a point cloud with points that are distributed across a 3D space and that collectively represent a 3D object. Each point of the point cloud is defined with positional elements that specify the position of the point in the 3D space of the point cloud, and is defined with non-positional element that specify visual characteristics (e.g., colors) of the point. The point cloud is encoded at a first resolution based on a first number of points that collectively form the 3D object.

In some embodiments, the point cloud is generated from scanning and/or imaging a physical form of the 3D object. For instance, the 3D object is a figurine of a character that is scanned from all sides in order to generate the point cloud representation or model of the character. In some embodiments, the point cloud is digitally created. For instance, an artist generates the character on a computer.

Process 400 includes defining (at 404) procedural shapes to represent the shapes or surfaces formed by different sets of the point cloud points using one or more procedural techniques. Defining (at 404) the procedural shapes may include parameterizing the representation of the 3D object formed by the point cloud points by deconstructing or segmenting the complex singular form of the 3D object into increasingly simpler shapes or surfaces, determining if the simpler shapes or surfaces may be accurately recreated with a parameterized equation or procedural shape, further deconstructing or segmenting the shapes or surfaces that cannot be accurately recreated with a parameterized equation or procedural shape, and saving the parameterized equations or procedural shapes that accurately recreate the deconstructed simpler shapes or surfaces. The procedural shapes may correspond to NURBS or a surface that is defined with one or more splines, control points, and/or other parameters. In some embodiments, 3D graphics system 100 defines (at 404) a plurality of procedural shapes to represent the entirety or all shapes and surfaces of the 3D object formed by the point cloud points. Each procedural shape may correspond to a shape formed by two or more of the point cloud points.

Process 400 includes generating (at 406) a 3D asset definition for the 3D object or the point cloud by linking the point cloud points to the defined (at 404) procedural shapes. The 3D asset definition specifies a link or association between each defined (at 404) procedural shape and the set of points from the point cloud that produce part or all of the shape or surface recreated by that defined (at 404) procedural surface. The link or association identifies the region within the 3D space of the point cloud for the procedural surface or where the set of points form the represented surface. In other words, the link or association may position and orient the procedural surface in the 3D space of the point cloud so that the procedural surface is aligned with the positions of the set of points that form part or all of the shape or surface recreated by that procedural surface, and may further specify the edges, boundaries, or endpoints for the procedural surface in the 3D space of the point cloud.

Process 400 includes receiving (at 408) a request to generate a 3D asset at a second resolution that is greater or different than the first resolution of the point cloud, wherein the 3D asset is a representation of the 3D object at the second resolution. For instance, the point cloud may be used to generate the 3D asset at the first resolution for a first generation gaming console, and the request may specify generating the 3D asset at the greater second resolution for a second generation gaming console that has more processing or graphics power than the first generation gaming console. Similarly, the 3D object may have been originally created for a first movie or animation, and may be reintroduced at the greater second resolution in a sequel (e.g., a second movie) or newer animation at a later time when processing or graphics power has increased. In either case, 3D graphics system 100 is able to generate the 3D asset at the second resolution without rescanning the 3D object at the higher resolution or manually recreating the digital representation at the higher resolution.

Process 400 includes selecting (at 410) each procedural surface that is associated with a different set of points from the point cloud and that procedurally or programmatically defines the shape or surface represented by the associated set of points at different regions of the point cloud and/or for different parts of the 3D object. In some embodiments, 3D graphics system 100 selects (at 410) each procedural surface by traversing through the 3D space covered by the point cloud, the points of the point cloud, or another representation of the point cloud (e.g., a binary tree representation, octree representation, or another tree-based representation of the point cloud) until all defined procedural surfaces associated with the point cloud points have been selected. In some other embodiments, 3D graphics system 100 selects (at 410) each procedural surface from the 3D asset definition in the order by which the procedural surfaces are encoded or entered in the definition.

Process 400 includes determining (at 412) a number of points to add to the region spanned by each procedural surface in order to adjust the resolution in that region to the second resolution. The determination (at 412) may be based on the existing set of points defined in the region and the difference between the current resolution as determined from the existing set of points and the second resolution. The current resolution may differ in different regions of the point cloud because of issues encountered when scanning and/or generating the point cloud from a physical object. The current resolution may be determined based on the density of the existing set of points, the spacing between the existing set of points, and/or the number of points and the size of the region spanned by that number of points.

Process 400 includes generating (at 414) the determined (at 412) number of new points for each region with positions that are aligned with the shape of the procedural surface defined for that region and with a distribution that adheres to the distribution of the existing set of points in that region.

Accordingly, 3D graphics system 100 plots the new points along the procedural surface with a spacing, structure, and/or pattern that supplements or continues the spacing, structure, and/or pattern formed by the existing set of points. The newly added points may inherit the color values from the nearest points of the existing set of points. For instance, if a newly added point is four units of distance from a first original point and one unit of distance from a second original point, 3D graphics system 100 may generate (at 414) the newly added point with color values that are 25% based on the color values of the first original point and that are 75% based on the color values of the second original point. In other words, the visual characteristics of the generated points may be derived from a weighted average of the visual characteristics of the existing set of points in the same region as the procedural surface used to generated the new points.

Process 400 includes presenting (at 416) the 3D asset at the second resolution by rendering the original points of the point cloud with the generated (at 414) points. In this manner, 3D graphics system 100 increases the resolution or points in each region of the point cloud while retaining and enhancing the exact shape and form of the represented 3D object so that the quality and detail of the 3D object is enhanced and the continuity of the represented surfaces is improved across the entirety of the 3D object (e.g., all surfaces of the 3D object).

From a single 3D asset definition, 3D graphics system 100 may generate the 3D asset at any of an infinite number of resolutions. Accordingly, the same 3D asset definition may be reused to present the same 3D asset with increasing detail or resolution over time as hardware resources improve or visual quality of games, movies, and/or 3D environments involving the 3D asset improve. The 3D object from which the 3D asset is generated need not be scanned at differing resolutions, and does not have to be digitally created at the different resolutions. Instead, a single encoding of the 3D object at one resolution is sufficient for 3D graphics system 100 to generate digital copies of that 3D object at any resolution with a level-of-detail or quality that directly corresponds to the resolution without quality degradation for shape deformation that may affect other upscaling techniques that interpolate surfaces or points as part of the upscaling.

Figure 5:
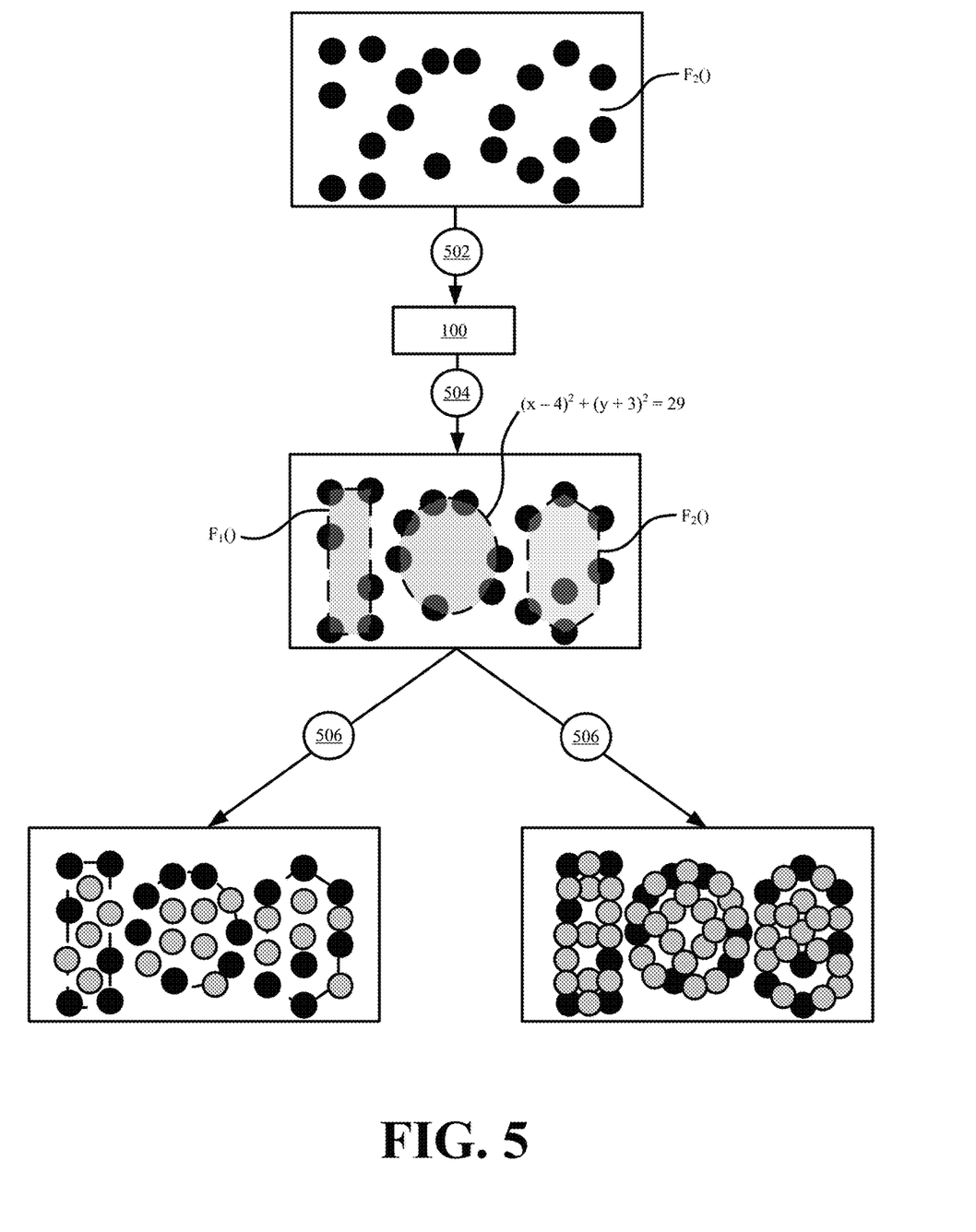
FIG. 5 illustrates an example of generating a 3D asset at different resolutions that exceed the resolution of an original encoding of the 3D object represented by the 3D asset by using the 3D asset definition in accordance with some embodiments presented herein.

FIG. 5 illustrates an example of generating a 3D asset at different resolutions that exceed the resolution of an original encoding of the 3D object represented by the 3D asset by using the 3D asset definition in accordance with some embodiments presented herein. 3D graphics system 100 receives (at 502) the original encoding of a 3D object. The original encoding includes a first number of points that are distributed in a 3D space of a point cloud with defined visual characteristics that collectively present the 3D object at a first resolution.

3D graphics system 100 detects (at 504) distinct partitioned and/or parameterized shapes of the 3D object at the first resolution. Detecting (at 504) the distinct partitioned and/or parameterized shapes includes defining the equations for the partitioned shapes forming the 3D object, and associating the equations for the partitioned shapes to the corresponding parts or regions of the original encoding or point cloud.

3D graphics system 100 generates (at 506) the 3D asset at a second resolution that is greater than the first resolution of the original encoding by adding a second number of points to the original first number of points at positions that intersect or are along the surfaces defined by the equations for the corresponding partitioned shapes of the 3D object. 3D graphics system 100 renders the first number of points and the added second number of points to generate a visualization of the 3D asset at the second resolution.

Similarly, 3D graphics system 100 generates (at 508) the 3D asset at a third resolution that is greater than the first resolution and the second resolution by adding a third number of points to the original first number of points at positions that intersect or are along the surfaces defined by the equations for the corresponding partitioned shapes of the 3D object, wherein the third number of points is greater than the second number of points. 3D graphics system 100 renders the first number of points and the added third number of points to generate a visualization of the 3D asset at the third resolution.

Figure 6:
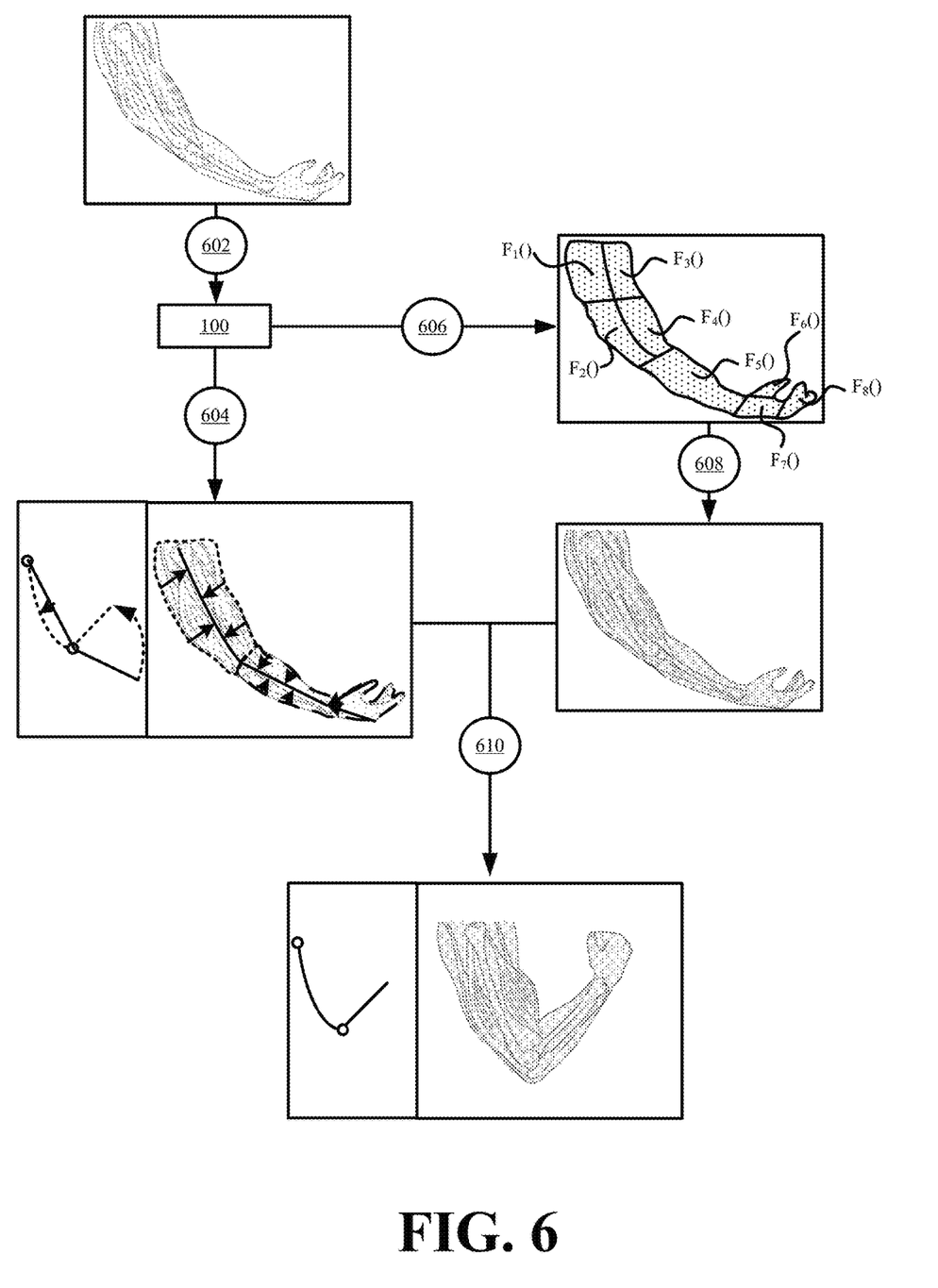
FIG. 6 illustrates an example of generating an animation at a dynamic resolution in accordance with some embodiments presented herein.

In addition to creating and rendering static 3D assets at any dynamic resolution, 3D graphics system 100 may adapt the 3D asset definitions for the creation and rendering of animated 3D assets at any dynamic resolution. For instance, a digital character may be created at a first resolution and animated across different frames of a movie, game, or animation. 3D graphics system 100 may use the 3D asset definition for the digital character to create the digital character at a greater second resolution that may be animated across different frames of the same or a different movie, game, or animation without manually recreating the digital character at the greater second resolution and/or redefining the animations of the digital character. Accordingly, the same 3D asset that was created and animated in a first movie, game, or animation at a first time with a first set of available resources may be dynamically upscaled and presented with the same animations in a second movie, game, or animation at a second time when a greater second set of resources become available without any action by a graphics artist or user other than to specify the new resolution for the asset. 3D graphics system 100 automatically regenerates the 3D asset at an increased resolution that also enhances the quality and/or detail of the 3D asset by increasing the resolution consistent with the exact shape, form, and/or continuity of the different surfaces that make up the 3D asset FIG. 6 illustrates an example of generating an animation at a dynamic resolution in accordance with some embodiments presented herein. 3D graphics system 100 receives (at 602) a point cloud that represents a static 3D object.

3D graphics system 100 defines (at 604) an animation framework for animating the static 3D object. Defining (at 604) the animation framework includes receiving user input for creating different animation elements (e.g., bones, pivot points, etc.) in the 3D space of the point cloud, defining movements for the animation elements at different times of the animation, and associating the animation defined for the different animation elements to different sets of the point cloud points. For instance, the user may generate a bone to model movements of an arm, may specify how the bone moves relative to other bones of the animation framework or at different times throughout an animation, and may link a particular set of points that represent the arm of a digital character to the bone. The animation defined for the bone is then transferred to the particular set of points such that the particular set of points moves in relation to the movements specified for the bone (e.g., keep a relative distance or position to the bone as the bone is animated).

3D graphics system 100 generates (at 606) the 3D asset definition for the point cloud and/or the static 3D object represented by the point cloud. As before, 3D graphics system 100 partitions the static 3D object into simpler shapes, defines the equations that recreate the partitioned simpler shapes, and associates each equation to the set of point cloud points that form the partitioned simpler shapes recreated by that equation using one or more parameterization and/or procedural modeling techniques.

The point cloud points therefore have two distinct associations. The first association is between the points and the animation elements of the animation framework. The second association is between the points and the procedural surfaces or the equations defined for the partitioned simpler shapes of the 3D object.

3D graphics system 100 renders (at 608) the animation at a specified dynamic resolution using the 3D asset definition. In some embodiments, prior to applying the animation from the animation framework to the point cloud points, 3D graphics system 100 increases the resolution of the point cloud to the specified dynamic resolution. For instance, 3D graphics system 100 generates new points at positions determined by the equations that are associated with each set of points representing a partitioned simpler shape of the 3D object. The new points are combined with the existing point cloud points to improve the detail, quality, and/or visual continuity of the partitioned simpler shapes by forming those partitioned simpler shapes with more points than were defined in the original point cloud.

3D graphics system 100 increases the resolution for the first frame of the animation and uses the increased resolution to render subsequent frames of the animation according to the animation framework. The new points that are added to a particular set of points associated with or linked to a particular animation element of the animation framework inherit the same animation element associations. In other words, the new points that form a partitioned simpler surface with a particular set of points will be animated the same as the particular set of points, and will be offset from their respective positions in the 3D space of the point cloud according to the movements that are defined for the one or more animation elements that are associated with or linked to the particular set of points. If the particular set of points are weighted to move differently than the movements defined for a particular animation element, then the new points will also inherit the same weighting. If different subsets of the particular set of points are linked to different animation elements and are animated differently, 3D graphics system 100 analyzes the positioning of each new point relative to the particular set of points, and defines the animation for that new point according to the animation element that is associated with whichever subset of points is closest to each of the new points.

3D graphics system 100 therefore increases the resolution of the point cloud or the represented 3D asset once rather than for each and every frame of the animation. The enhanced point cloud at the specified dynamic resolution (e.g., the original points and the added points) is then animated (at 610) according to the animation framework. Consequently, the animated 3D object is presented at the specified dynamic resolution throughout the animation and/or for the different movements specified for the 3D object at the different times of the animation by repositioning the original points and the added points for every frame of the animation instead of animating only the original points for every frame, parameterizing the animated 3D object at every frame, and then increasing the resolution of the animated 3D object at every frame.

In some embodiments, 3D graphics system 100 dynamically adapts the resolution of a 3D animation to maintain consistent visual quality and detail and/or to avoid unnecessary upscaling or processing and rendering of unnecessary detail. In some such embodiments, 3D graphics system 100 tracks a position from which a 3D asset is rendered. For instance, 3D graphics system 100 may track the position of a virtual camera relative to the position of the 3D asset in a 3D space. 3D graphics system 100 determines the quality of the 3D asset when rendered from the virtual camera position, and dynamically increases the resolution of the 3D asset or visible parts of the 3D asset when the resolution or visual quality is below a threshold from the virtual camera position. 3D graphics system 100 may render the 3D asset at a lower resolution when the 3D asset is viewed from a distance, and may dynamically increase the resolution of the 3D asset when zooming into the 3D asset or viewing the 3D asset from a closer distance.

Figure 7:
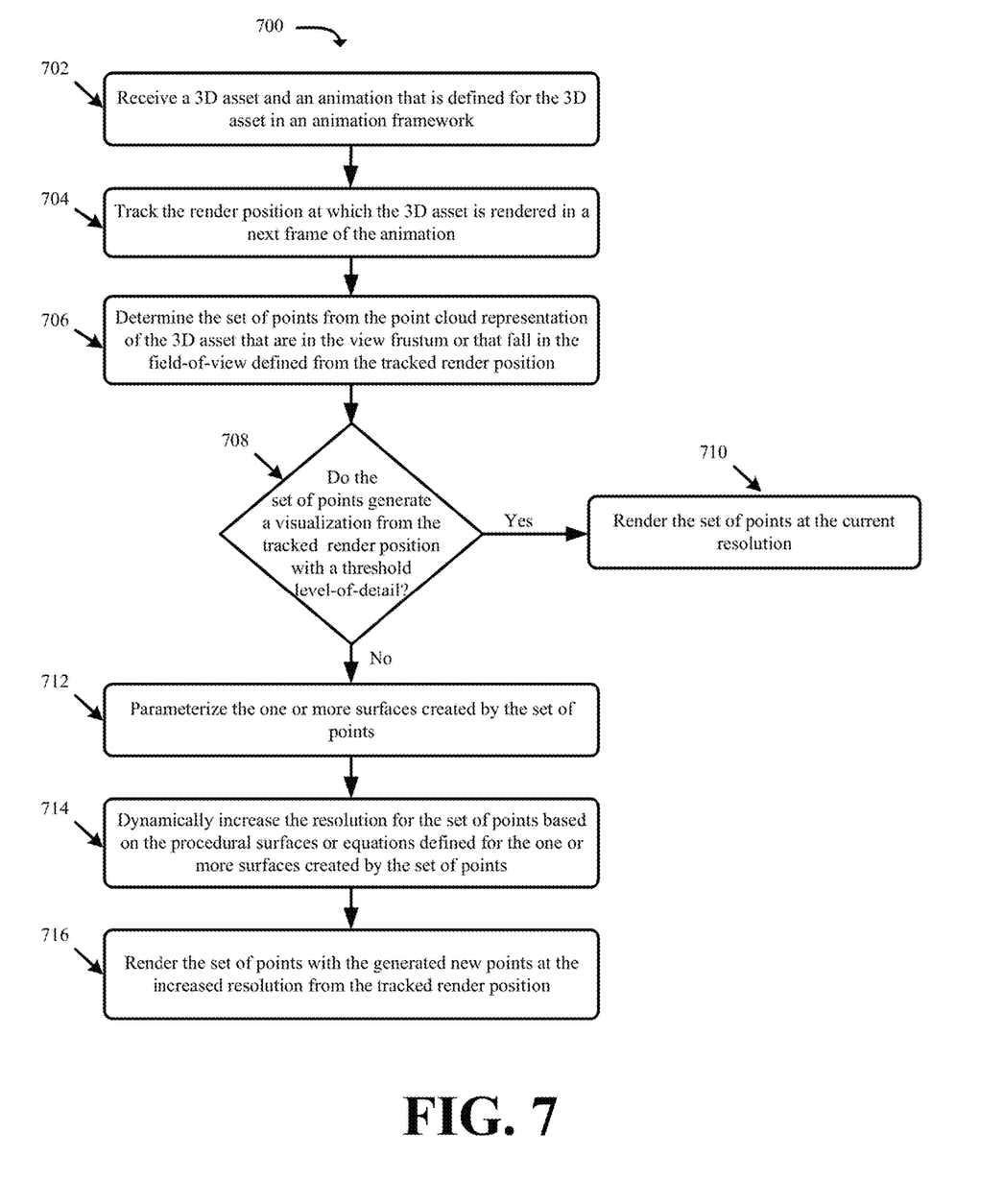
FIG. 7 presents a process for dynamically adapting the resolution of a 3D asset during an animation in accordance with some embodiments presented herein.

FIG. 7 presents a process 700 for dynamically adapting the resolution of a 3D asset during an animation in accordance with some embodiments presented herein. Process 700 is implemented by 3D graphics system 100.

Process 700 includes receiving (at 702) a 3D asset and an animation that is defined for the 3D asset in an animation framework. The 3D asset may be a point cloud representation of a 3D character, and the animation framework may specify bones, joints, and/or other animation elements that are linked to different sets of the point cloud points and that specify how the different sets of points move as part of different character animations (e.g., walking, running, jumping, punching, turning, falling, etc.).

Process 700 includes tracking (at 704) the render position at which the 3D asset is rendered in a next frame of the animation. The render position corresponds to a position of a virtual camera in the 3D space of the point cloud or a 3D environment from which the 3D asset is rendered. Each frame of the animation may include changing the render position and/or moving one or more sets of points as part of animating the 3D asset. Changing the render position changes the perspective from which the 3D asset is rendered and/or from which the 3D asset is presented in the 3D environment. For instance, the render may change to zoom into the 3D asset or to show the 3D asset from a different side, height, or angle while points of the 3D asset are repositioned for an animation occurring at the corresponding time or the corresponding frame of the animation.

Process 700 include determining (at 706) the set of points from the point cloud representation of the 3D asset that are in the view frustum or that fall in the field-of-view defined from the tracked (at 704) render position. In some embodiments, the set of points may include all points of the point cloud or less than all of the points when the render position defines a field-of-view that shows part of the 3D asset or the 3D asset from a particular side or angle. The set of points may differ from points of the original 3D asset as the set of points may have been moved or otherwise adjusted off their original values for the next frame of the animation.

Process 700 includes determining (at 708) whether the set of points generate a visualization of the 3D asset from the tracked (at 704) render position with a threshold level-of-detail. In some embodiments, 3D graphics system 100 compares the spacing between the set of points or the density of the set of points when rendered from the render position to determine if the threshold level-of-detail is met. The threshold level-of-detail is not met when the spacing or gaps between the points become visible from the tracked (at 704) render position. For instance, the set of points at the current resolution may form a continuous surface when rendered at a greater first distance. However, as the render position moves closer and renders the set of points from a closer second distance, the spacing between the set of points at the current resolution may become visible creating breaks, gaps, or other visual discontinuity in the represented surface. Accordingly, 3D graphics system 100 may need to increase the resolution and/or the points representing the surface in order to restore the threshold level-of-detail and present the surface as a continuous surface from the closer second distance.

Process 700 includes rendering (at 710) the set of points at the current resolution in response to determining (at 708—Yes) that the set of points generate the visualization of the 3D asset from the tracked (at 704) render position with the threshold level-of-detail. In other words, 3D graphics system 100 renders the next frame of the animation by modifying the positioning and/or visual characteristics o the set of points according to the animation that is defined for the next frame in the animation framework and by presenting the surfaces created by the set of points after applying the animation from the render position.

Process 700 includes parameterizing (at 712) the one or more surfaces created by the set of points in response to determining (at 708—No) that the set of points generate the visualization of the 3D asset from the tracked (at 704) render position with less than the threshold level-of-detail. For instance, 3D graphics system 100 may determine that the spacing between the points or the number of points from the tracked (at 704) render position is insufficient to provide the threshold level-of-detail, that the spacing creates discontinuities in the rendered surfaces, or that the current resolution is too low for the distance separating the render position from the set of points.

Parameterizing (at 712) the one or more surfaces created by the set of points involves defining the procedural surfaces or equations for the one or more surfaces created by the set of points rather than all surfaces of the 3D asset. Accordingly, 3D graphics system 100 performs a focused parameterization for the surfaces in the current field-of-view of the next frame.

Process 700 includes dynamically increasing (at 714) the resolution for the set of points based on the procedural surfaces or equations defined for the one or more surfaces created by the set of points. 3D graphics system 100 generates new points to insert with the set of points at positions defined along the procedural surfaces or the surfaces created by the defined equations. The new points cover any gaps between the set of points that may be visible from the tracked (at 704) render position and resolve any visual discontinuity when rendering the set of points from the tracked (at 704) render position.

Process 700 includes rendering (at 716) the set of points with the generated new points at the increased resolution from the tracked (at 704) render position. The set of points combined with the generated new points produce continuous surfaces that accurately recreate the adjusted shape and form of the one or more surfaces created by the set of points after applying the animation to the set of points and with a greater level-of-detail, greater number of points, and/or higher resolution than when rendering the corresponding surfaces using only the set of points.

The generated new points may be retained in the point cloud and linked to the same animation elements in the animation framework as the set of points and with the same weighting as the set of points so that the new points do not have to be regenerated when the set of points are included in subsequent frames of the animation. Moreover, since 3D graphics system 100 performs the parameterization and resolution increase for different parts of the 3D asset at different times, the computational overhead is reduced relative to performing the same operations for the entirety of the 3D asset such that the operations may be performed as part of the rendering pipeline of a 3D animation.

Figure 8:
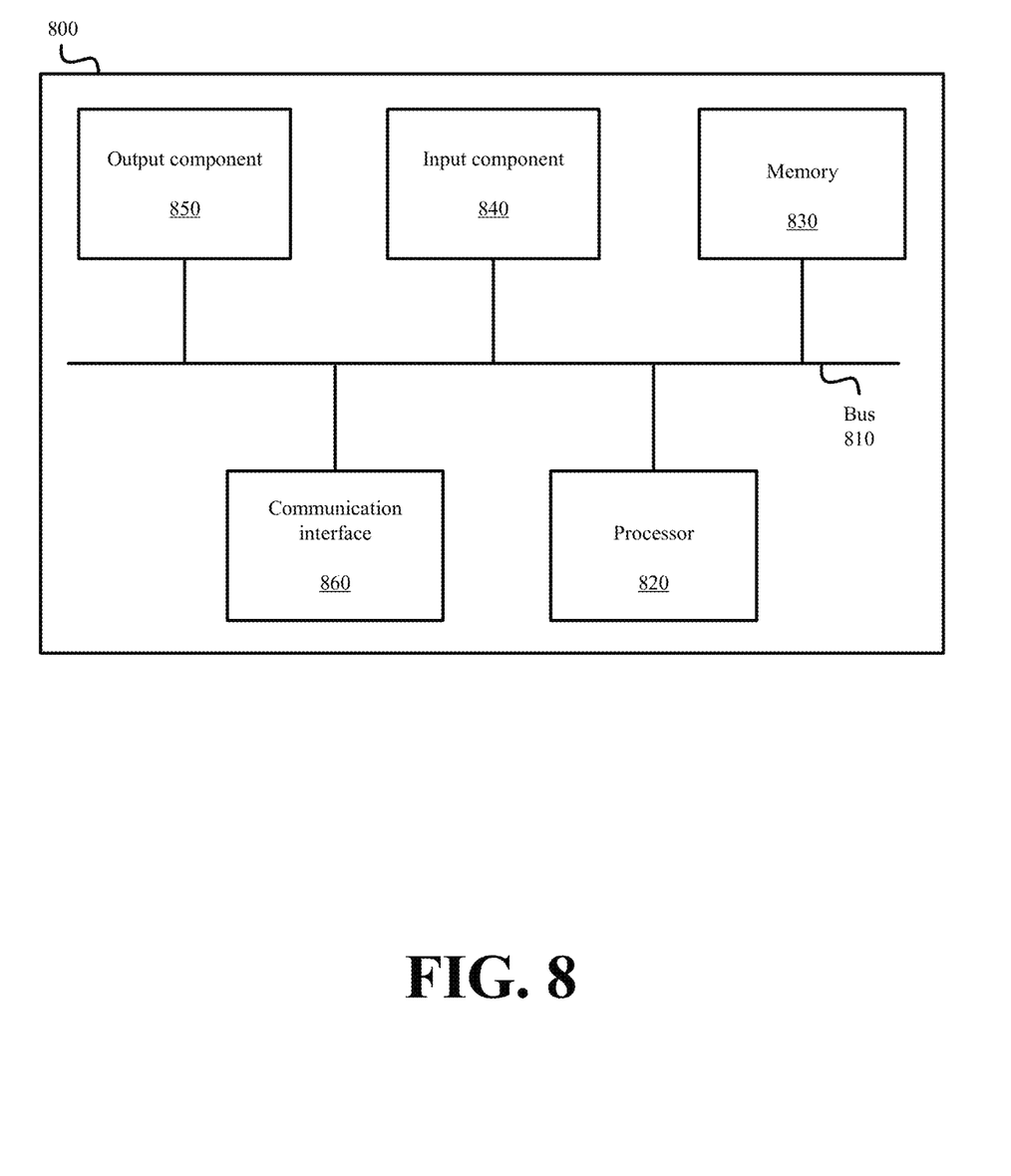
FIG. 8 illustrates example components of one or more devices, according to one or more embodiments described herein.

FIG. 8 is a diagram of example components of device 800. Device 800 may be used to implement one or more of the tools, devices, or systems described above (e.g., 3D graphics system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a three-dimensional ("3D") asset comprising a plurality of points that collectively form a shape of a 3D object at a first resolution;
   partitioning the shape of the 3D object into a plurality of simpler shapes that conform to shapes created by a plurality of procedural surfaces, wherein partitioning the shape comprises:
   selecting a set of points from the plurality of points;
   determining that a first simpler shape formed by the set of points differs by more than a threshold amount from the shapes created by the plurality of procedural surface;
   segmenting the first simpler shape into a second simpler shape and a third simpler shape by selecting a first subset of points from the set of points that form the second simpler shape and a second subset of points from the set of points that form the third simpler shape in response to determining the first simpler shape differs by more than the threshold amount;
   determining that a first procedural surface from the plurality of procedural surfaces creates a first shape that matches the second simpler shape by the threshold amount; and
   determining that a second procedural surface from the plurality of procedural surfaces creates a second shape that matches the third simpler shape by the threshold amount;
   defining the plurality of procedural surfaces that recreate the plurality of simpler shapes with one or more splines, wherein defining the plurality of procedural surfaces comprises defining a first mathematical equation for at least a first spline that generates the first shape within the threshold amount of the second simpler shape formed by the first subset of points and defining a second mathematical equation for at least a second spline that generates the second shape within the threshold amount of the third simpler shape formed by the second subset of points;
   generating new points amongst the plurality of points at positions along each simpler shape that is recreated by a different procedural surface of the plurality of procedural surfaces; and
   generating the 3D asset at a second resolution that is greater than the first resolution by rendering the new points with the plurality of points.

2. The method of claim 1 further comprising:
   determining a particular equation associated with a particular procedural surface that recreates a particular simpler shape from the plurality of simpler shapes; and
   linking the particular equation to a group of points from the plurality of points that form a part of the particular simpler shape.

3. The method of claim 2, wherein generating the new points comprises:

determining a particular number of points that increases a resolution of the particular simpler shape to the second resolution based on a spacing between or a density of the group of points;
generating a particular surface that recreates the particular simpler shape over a region spanned by the group of points using the particular equation associated with the particular procedural surface; and
generating the particular number of points at positions that intersect or contact the particular surface.

4. The method of claim 2, wherein generating the new points comprises:
increasing the first resolution of the particular simpler shape to the second resolution by defining one or more new points at positions along a surface that is defined from the particular equation and that spans the group of points.

5. The method of claim 2, wherein generating the new points comprises:
generating a surface that spans the group of points of the 3D asset from the particular equation; and
adding one or more new points along the surface.

6. The method of claim 1 further comprising:
receiving a request to increase a resolution of the 3D asset from the first resolution to the second resolution; and
presenting the 3D asset at the second resolution in response to rendering the new points with the plurality of points.

7. The method of claim 1 further comprising:
associating each procedural surface of the plurality of procedural surfaces to a different set of points from the plurality of points that form one of the plurality of simpler shapes recreated by that procedural surface.

8. The method of claim 1, wherein partitioning the shape further comprises:
associating the first procedural surface to the first subset of points and the second procedural surface to the second subset of points.

9. The method of claim 1, wherein generating the new points amongst the plurality of points comprises:
detecting a gap between neighboring points from the plurality of points that form a particular simpler shape from the plurality of simpler shapes; and
generating one or more new points to fill the gap at a position on the particular simpler shape using a procedural surface that recreates the particular simpler surface.

10. The method of claim 1 further comprising:
defining a different procedural shape based on one or more splines of a procedural surface of the plurality of procedural surfaces that matches a different simpler shape of the plurality of simpler shapes at a corresponding position of the different simpler shape about the 3D asset.

11. The method of claim 1 further comprising:
receiving a request to render the 3D asset at a third resolution that is greater than the second resolution;
generating additional points amongst the new points and the plurality of points at positions along each simpler shape that is recreated by a different procedural surface of the plurality of procedural surfaces; and
rendering the additional points with the new points and the plurality of points in order to generate the 3D asset at the third resolution.

12. The method of claim 1, wherein each procedural surface is defined at a position in a 3D space of the 3D asset that corresponds to a position of a simpler surface that is recreated by that procedural surface.

13. A three-dimensional ("3D") graphics system comprising:
one or more hardware processors configured to:
receive a 3D asset comprising a plurality of points that collectively form a shape of a 3D object at a first resolution;
partition the shape of the 3D object into a plurality of simpler shapes that conform to shapes created by a plurality of procedural surfaces, wherein partitioning the shape comprises:
selecting a set of points from the plurality of points;
determining that a first simpler shape formed by the set of points differs by more than a threshold amount from the shapes created by the plurality of procedural surface;
segmenting the first simpler shape into a second simpler shape and a third simpler shape by selecting a first subset of points from the set of points that form the second simpler shape and a second subset of points from the set of points that form the third simpler shape in response to determining the first simpler shape differs by more than the threshold amount;
determining that a first procedural surface from the plurality of procedural surfaces creates a first shape that matches the second simpler shape by the threshold amount; and
determining that a second procedural surface from the plurality of procedural surfaces creates a second shape that matches the third simpler shape by the threshold amount;
define the plurality of procedural surfaces that recreate the plurality of simpler shapes with one or more splines, wherein defining the plurality of procedural surfaces comprises defining a first mathematical equation for at least a first spline that generates the first shape within the threshold amount of the second simpler shape formed by the first subset of points and defining a second mathematical equation for at least a second spline that generates the second shape within the threshold amount of the third simpler shape formed by the second subset of points;
generate new points amongst the plurality of points at positions along each simpler shape that is recreated by a different procedural surface of the plurality of procedural surfaces; and
generate the 3D asset at a second resolution that is greater than the first resolution by rendering the new points with the plurality of points.

14. The 3D graphics system of claim 13, wherein the one or more hardware processors are further configured to:
determine a particular equation associated with a particular procedural surface that recreates a particular simpler shape from the plurality of simpler shapes; and
link the particular equation to a group of points from the plurality of points that form a part of the particular simpler shape.

15. The 3D graphics system of claim 14, wherein generating the new points comprises:
determining a particular number of points that increases a resolution of the particular simpler shape to the second resolution based on a spacing between or a density of the group of points;
generating a particular surface that recreates the particular simpler shape over a region spanned by the group of points using the particular equation associated with the particular procedural surface; and generating the particular number of points at positions that intersect or contact the particular surface.

16. The 3D graphics system of claim 14, wherein generating the new points comprises:

increasing the first resolution of the particular simpler shape to the second resolution by defining one or more new points at positions along a surface that is defined from the particular equation and that spans the group of points.

17. The 3D graphics system of claim 14, wherein generating the new points comprises:

generating a surface that spans the group of points of the 3D asset from the particular equation; and adding one or more new points along the surface.

18. The 3D graphics system of claim 13, wherein the one or more hardware processors are further configured to:

receive a request to increase a resolution of the 3D asset from the first resolution to the second resolution; and present the 3D asset at the second resolution in response to rendering the new points with the plurality of points.

19. The 3D graphics system of claim 13, wherein the one or more hardware processors are further configured to:

associate each procedural surface of the plurality of procedural surfaces to a different set of points from the plurality of points that form one of the plurality of simpler shapes recreated by that procedural surface.

20. A non-transitory computer-readable medium storing instructions that, when executed by one or more processors of a three-dimensional ("3D") graphics system, cause the 3D graphics system to perform operations comprising:

receiving a 3D asset comprising a plurality of points that collectively form a shape of a 3D object at a first resolution;

partitioning the shape of the 3D object into a plurality of simpler shapes that conform to shapes created by a plurality of procedural surfaces, wherein partitioning the shape comprises:

selecting a set of points from the plurality of points;

determining that a first simpler shape formed by the set of points differs by more than a threshold amount from the shapes created by the plurality of procedural surface;

segmenting the first simpler shape into a second simpler shape and a third simpler shape by selecting a first subset of points from the set of points that form the second simpler shape and a second subset of points from the set of points that form the third simpler shape in response to determining the first simpler shape differs by more than the threshold amount;

determining that a first procedural surface from the plurality of procedural surfaces creates a first shape that matches the second simpler shape by the threshold amount; and determining that a second procedural surface from the plurality of procedural surfaces creates a second shape that matches the third simpler shape by the threshold amount;

defining the plurality of procedural surfaces that recreate the plurality of simpler shapes with one or more splines, wherein defining the plurality of procedural surfaces comprises defining a first mathematical equation for at least a first spline that generates the first shape within the threshold amount of the second simpler shape formed by the first subset of points and defining a second mathematical equation for at least a second spline that generates the second shape within the threshold amount of the third simpler shape formed by the second subset of points;

generating new points amongst the plurality of points at positions along each simpler shape that is recreated by a different procedural surface of the plurality of procedural surfaces; and generating the 3D asset at a second resolution that is greater than the first resolution by rendering the new points with the plurality of points.

* * * * *